United States Patent
Contreras Delpiano et al.

(10) Patent No.: US 8,594,859 B2
(45) Date of Patent: Nov. 26, 2013

(54) METHOD AND SYSTEM FOR REAL-TIME AGGREGATION OF ELECTRIC VEHICLE INFORMATION FOR REAL-TIME AUCTIONING OF ANCILLARY SERVICES, AND REAL-TIME LOWEST COST MATCHING ELECTRIC VEHICLE ENERGY DEMAND TO CHARGING SERVICES

(75) Inventors: Raul I. Contreras Delpiano, San Diego, CA (US); Andrew A. Wood, San Diego, CA (US); Manuel E. Jaime, San Diego, CA (US); Oliver Michaelis, San Diego, CA (US); Kamran Moallemi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 13/275,233

(22) Filed: Oct. 17, 2011

(65) Prior Publication Data

US 2012/0095830 A1    Apr. 19, 2012

Related U.S. Application Data

(60) Provisional application No. 61/394,281, filed on Oct. 18, 2010.

(51) Int. Cl.
*G05D 1/00*  (2006.01)

(52) U.S. Cl.
USPC .................................. 701/2; 705/53; 705/412

(58) Field of Classification Search
USPC .................. 701/2; 705/53, 57, 80, 30, 32, 412
See application file for complete search history.

(56) References Cited

U.S. PATENT DOCUMENTS

| | | | |
|---|---|---|---|
| 2008/0281663 A1* | 11/2008 | Hakim et al. | 705/8 |
| 2010/0082464 A1 | 4/2010 | Keefe | |
| 2011/0004406 A1 | 1/2011 | Davis | |
| 2011/0055036 A1 | 3/2011 | Helfan | |

OTHER PUBLICATIONS

International Search Report and Written Opinion—PCT/US2011/056787—ISA/EPO—Jan. 2, 2012.
Kamboj, S., et al., "Deploying Power Grid-Integrated Electric Vehicles as a Multi-Agent System" Proceedings of 10th International Conference on Autonomous Agents and Multiagent Systems—Innovative Applications Track (AAMAS, May 2011), pp. 1-8.

\* cited by examiner

*Primary Examiner* — Thomas Black
*Assistant Examiner* — Luke Huynh
(74) *Attorney, Agent, or Firm* — Ankur Garg

(57) ABSTRACT

Ancillary service capability data is received in real time from participating electrical vehicles (EVs) connected through EV charging equipment to a power grid. Aggregate offers based on the ancillary service capability data from participating EVs are generated and matched with requests received from electrical power generating entities for ancillary service electrical power. Associated with the matches, ancillary power is transferred from batteries of one or more EV batteries to the power grid and, based on received transaction parameters, transaction payment is made.

94 Claims, 5 Drawing Sheets

METHOD AND SYSTEM FOR REAL-TIME AGGREGATION OF ELECTRIC VEHICLE INFORMATION FOR REAL-TIME AUCTIONING OF ANCILLARY SERVICES, AND REAL-TIME LOWEST COST MATCHING ELECTRIC VEHICLE ENERGY DEMAND TO CHARGING SERVICES

This application claims the benefit of U.S. Provisional Application No. 61/394,281, filed Oct. 18, 2010.

FIELD OF DISCLOSURE

The present application pertains to electric power and, more particularly, to providing and transacting electric power and related services.

BACKGROUND

It is generally believed that crude oil reserves, at least those extractable using present economically practical means, will continue to decrease while, at the same time, due to factors such as population changes and demographic shifts, the number of people requiring, or desiring personal vehicular transportation will continue to increase. Electric drive vehicles (EVs), meaning vehicles propelled by an electric motor and having local means (e.g., storage batteries) for storing the electricity to power the electric motor, have been long known as a promising technological means to adapt to the first of these trends and, at the same time, accommodate the second trend. However, for nearly as long as EVs have been seen as a potential solution to these trends of a decline in crude oil and increase in drivers, it has been known that difficulties must be overcome for EVs to be an actual replacement for fossil fuel vehicles.

One example of such difficulties is that the marketplace mechanism for conveying the electric power product of the electric power entities to the EV owners is not yet defined, much less established. Lack of this marketplace mechanism can prevent optimal matching of available electric power supply to EV electric power demand need. The marketplace for conveying fossil fuel from supplier to purchaser is, in contrast, very well established. However, these marketplace mechanisms for fossil fuel have evolved and are optimized for moving product, one-way only, from a very small number of sources to a very large number of end customers. Such mechanisms cannot accommodate the dynamic, multiple-supplier, potentially two-way market of EV electric power.

There are existing market mechanisms for certain kinds of electric power, such as for homeowners to select a power generating entity among multiple of such competing entities. However, these market mechanisms are based on slow-moving supply and demand, with a small number of large scale supplier, and can embody little more than distributing to homeowners a plurality plans formulated by each of a small number of competing electric power generating entities. The homeowner selects among these competing plans, which can lock the homeowner into the plan (e.g., for one year), and contractually obligate the electric power supplier to provide the power at the promised price for that duration. This and other known mechanisms, however, do not provide for real-time communication and processing of supply information, or demand information among participants in an EV charging service market having, for example, hundreds of thousands of EVs in a constantly changing state of operation, and state of demand, and a large number of electric power providers. Such known mechanisms can therefore be incapable of ensuring the market drives the price point for transacting electric power among EVs and electric power providers to an accurate supply-demand curve between well-informed parties.

SUMMARY

The following presents a summary of some aspects of one or more exemplary embodiments. The purpose of this summary is to provide a basic introduction to certain aspects as a prelude to the more detailed description that is presented below. This summary is not an extensive overview of all contemplated aspects, and is not intended to identify key or critical elements of, nor delineate the scope of any aspect.

Various exemplary embodiments provide, though collection and aggregation of demand information from EVs and capacity information from electric power source entities, an efficient matching of demand with available capacity. As will be appreciated, among other features and benefits enabled by this matching are a reduction in resource waste by, for example, enabling better use of previously non-exploitable capacity, and better matching of cost and demand in the delivery schedule of electricity.

Various exemplary embodiments also provide reliable, on-tap back-up power, and quick-response supplemental power providing, among other features, an enabling of ancillary services without the previously required construction, operation and maintaining dedicated back-up power generation resources, though information exchange between EVs having electrical charge within their storage batteries, and entities in need of electrical power resources to provide such back-up and supplemental power.

Various exemplary embodiments further provide, by exploiting the inherent geographic distribution of EVs, a distributed electrical power resource, enabling a granularity in grid control potentially superior to that proved through convention grid control methods and systems.

One method, according to one exemplary embodiment, provides real-time aggregating of electrical vehicle (EVs) energy capacity for real-time auctioning of ancillary services, and can include receiving a set-up data identifying each of a plurality of participating EVs, aggregating, in real time, EV energy capacity data from each of a plurality of participating EVs, generating, based on the EV energy capacity data, an aggregated ancillary services offer, and communicating the aggregated ancillary services offer to an auction entity.

In one aspect the aggregating in real time can include communicating EV energy capacity data from at least one of the plurality of participating EVs over a real-time wireless link. In a further aspect, the real-time wireless link can be a wireless cellular communication link.

In one aspect, a method according to one exemplary embodiment can further include aggregating, in real time, EV energy demand data from each of a plurality of the participating EVs, and generating and communicating to the auction entity, based on a result of the aggregating, at least one aggregated EV energy demand.

In a further aspect, a method according to one exemplary embodiment can further include receiving from the auction entity an aggregator ancillary services control command indicating a matching of an aggregated ancillary services offer with an ancillary services requirement.

In a further aspect, at least one participating EV can be identified as associated with the aggregated ancillary services offer indicated as matching the ancillary services requirement, and an EVSE ancillary services control command can be sent to the at least one participating EV, and the EVSE ancillary services control command can indicate a control of the EVSE for delivering a power from a storage battery of the associated participating EV to a power grid.

In a further aspect, a method according to one exemplary embodiment can further include receiving, from at least one of the at least one participating EVs and an EVSE associated with each of the at least one participating EVs, an EV verification information corresponding to the EVSE ancillary services control command. One further aspect can include sending to the auction entity an aggregated verification information based, at least in part, on the EV verification information. In still one further aspect, settling a transaction payment to at least one of the participating EV identified as associated with the aggregated ancillary services offer indicated as matching the ancillary services requirement can be conditional on receiving an EV verification information from the at least one of the participating EVs.

In a further aspect, a method according to one exemplary embodiment can further include receiving, from the auction entity, an EV charging enablement data associated with an aggregated EV energy demand among the communicated aggregated EV energy demands and a matching EV charging service offer indicating an offering power generator; and can further include controlling, based on the received EV charging enablement data, a charging of at least one of the participating EVs.

In one aspect, a method according to one exemplary embodiment can include testing whether an operability of a real-time wireless communications link from an aggregator entity to one of the participating EVs fails to meet a given criterion and, further, if a result of the testing indicates the real-time wireless communication link fails to meet the given criterion, can include enabling a charging of the participating EV at a default rate.

In one related aspect, enabling the charging of the participating EV at the default rate can include communicating an indication to the participating EV of a default rate offer, over a secondary communication channel. In one further aspect, communicating over the secondary communication channel can include communicating over a text-messaging channel of a wireless cellular network.

In one aspect of one method, according to one exemplary embodiment, an EV energy capacity data from at least one of the participating EVs includes a geographic location identifier indicating a geographic location of the participating EV. In one further aspect the generating and communicating to the auction entity at least one aggregated ancillary services offer can be further based, at least in part on the geographic location identifier of the participating EVs associated with the aggregated ancillary services offer. In one further aspect, the generating and communicating the aggregate ancillary services offer based at least in part on the EV location data from at least one of the EVs can comprise calculating a virtual location based on the EV location data, and can include the virtual location with the aggregated ancillary services offer.

One method, according to another exemplary embodiment, provides for real-time aggregating of electrical vehicle (EV) charging and can include comprising aggregating, in real time, EV energy demand data from each of a plurality of the EVs, and generating and communicating to the auction entity, based on a result of the aggregating, at least one aggregated EV energy demand.

In one aspect, one method according to one other exemplary embodiment can further include receiving, from the auction entity, an EV charging enablement data associated with an aggregated EV energy demand among the communicated aggregated EV energy demands and a matching EV charging service offer indicating an offering power generator, and controlling, based on the received EV charging enablement data, a charging of at least one of the EVs.

One exemplary embodiment can provide an aggregator for real-time aggregating of electrical vehicle (EVs) energy capacity for real-time auctioning of ancillary services, and can include means for receiving a set-up data identifying each of a plurality of participating EVs, means for aggregating, in real time, EV energy capacity data from each of a plurality of participating EVs, means for generating, based on the EV energy capacity data, an aggregated ancillary services offer, and means for communicating the aggregated ancillary services offer to an auction entity.

Another exemplary embodiment can provide an aggregator for real-time aggregating of electrical vehicles (EVs) charging, and can include means for aggregating, in real time, EV energy demand data from each of a plurality of the EVs, and means for generating and communicating to the auction entity, based on a result of the aggregating, at least one aggregated EV energy demand.

In one aspect, one aggregator according to one other exemplary embodiment can include means for receiving, from the auction entity, an EV charging enablement data associated with an aggregated EV energy demand among the communicated aggregated EV energy demands and a matching EV charging service offer indicating an offering power generator, and means for controlling, based on the received EV charging enablement data, a charging of at least one of the EVs.

One exemplary embodiment can provide a computer program product, having a computer-readable medium comprising a set of computer instructions that upon execution would cause an associated processor to perform a real-time aggregating of electrical vehicle (EVs) energy capacity for real-time auctioning of ancillary services, and the computer instructions can include instructions to receive a set-up data identifying each of a plurality of participating EVs, instructions to aggregate, in real time, EV energy capacity data from each of a plurality of participating EVs, instructions to generate, based on the EV energy capacity data, an aggregated ancillary services offer, and instructions to communicate the aggregated ancillary services offer to an auction entity.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
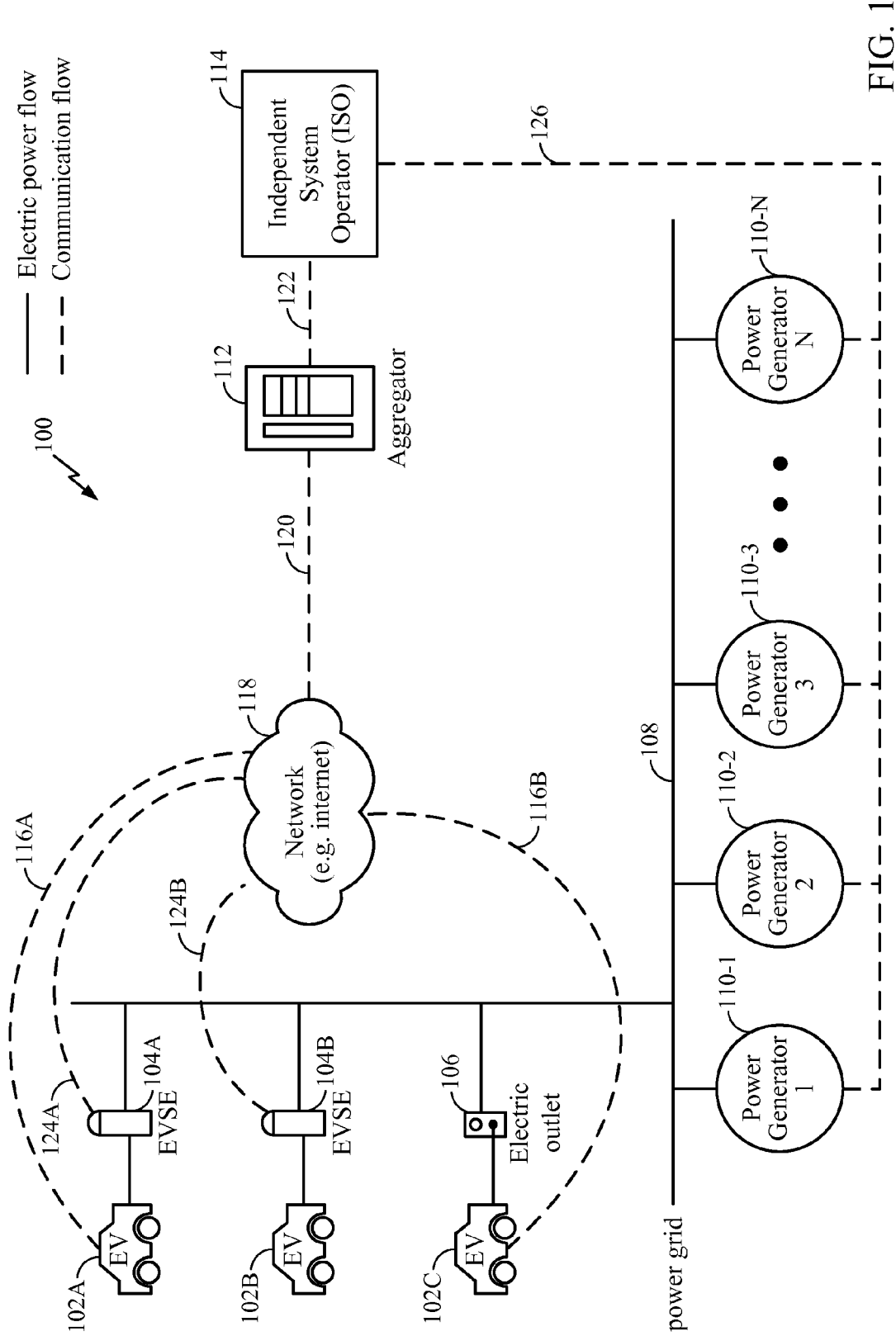
FIG. 1 shows one example high-level schematic diagram of one EV electric service demand and ancillary service aggregation system according to one exemplary embodiment.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention. The labeling terminology used herein is for the purpose of referencing illustrative implementations, or pointing to particular functional blocks of representative, explanatory models, each of these illustrative implementations and models and demonstrating through example, concepts of the embodiments. The labels terminology, however, is not intended to be limiting of systems, methods and devices for practicing according to the disclosed embodiments.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Various embodiments are described in terms of sequences of actions to be performed by, for example, elements of a computing device. It will be readily understood by persons of ordinary skill in the arts pertaining to the embodiments, from this disclosure, that various of the described sequences of actions may be performed by various means, such as specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

"Electric power grid" as used herein means a combination of electric power transmission lines and electric power distribution equipment coupled to a plurality of geographically dispersed electric power generators.

"Electric vehicle" (EV) as used herein means any vehicle for transporting persons on public roadways, having an electric motor for propelling the vehicle and having a storage battery to store and deliver electric power to the electric motor and that is capable of being charged by an external source, such as a battery charging equipment, with electrical power from a power grid, and that is capable of delivering charge from the storage battery to the power grid, and encompasses vehicles having an additional or alternative charging capability (e.g., internal-combustion engine powered generator, regenerative or solar power) and encompasses vehicles having an additional or alternative propulsion means (e.g., "hybrid" vehicles).

"Independent System Operator" and "ISO" as used herein are synonymous in meaning and are interchangeable, and the meaning includes but is not limited to any entity within the scope of "Independent System Operator" (hereinafter "ISO") and/or within the scope of "Regional Transmission Organization" (hereinafter "RTO") as defined and/or described by the Federal Energy Regulatory Commission (FERC), including but not limited to: any entity embodying or formed of "tight power pools to satisfy the requirement of providing non-discriminatory access to transmission" as recited by the FERC, or having characteristics otherwise meeting the description of "ISO" within FERC Order Nos. 888/889, or substantially meeting the requirements of "RTO" specified by FERC Order 2000, for example, without limitation, any one of and any grouping of: New York ISO (NYISO); California ISO (CAISO), Midwest ISO (MISO); ISO New England Inc. (ISO-NE); PJM Interconnect (PJM); Southwest Power Pool, Inc. (SPP); and Electric Reliability Council of Texas (ERCOT).

"ISO" as used herein further encompasses any entity embodying or formed of "tight power pools to satisfy the requirement of providing non-discriminatory access to transmission" as recited by the FERC, that is formed or recognized under any laws, statutes, or regulations adopted by or promulgated by, or orders issued by any foreign sovereign government, and that have a primary organizational purpose comparable to an ISO as described by FERC Orders Nos. 888/889 or an RTO as set forth by FERC Order 2000, for example, without limitation, Ontario Independent Electricity System Operator; and Alberta Electric System Operator (AESO).

"Scan rate" as used herein encompasses its ordinary and customary meaning to persons of ordinary skill in the ISO art, a meaning that includes, without limitation the rate at which the ISO senses the status of the grid system to which the power generating units are or can be connected, a rate that can be, but is not limited to being, anywhere in an example range extending from, for example, approximately 2 seconds up to and including, for example, approximately 6 seconds.

"Real-time communication" as used herein means a communication path, e.g., a "link," capable of communicating information, from end point to end point of the real-time communication link, with an end point to end point latency less than the scan rate.

"Aggregator" as generally used herein means a market entity that performs the processes and functions described herein as "aggregating" may be embodied as any of, without limitation, a business unit within a utility, a business entity wholly separate from any utility, and a governmental organization or agency, and separated company, or a business unit within a utility.

"Aggregator" as specifically used herein in the context of communications to and from the "aggregator" means the processing resources controlled by, or on behalf of the aggregator, for performing the described "aggregating" processes.

Various features and benefits of the present embodiments will be apparent to persons of ordinary skill in the power grid art from this disclosure, both from the explicitly described example applications and implementations, and from other applications and implementations that will be apparent to such persons in view of this disclosure.

Among various features and benefits of systems and methods according to the exemplary embodiment is a real-time optimized use of what will soon be a vast, well distributed, but otherwise idle resource, namely parked EVs, to provide an equally distributed supplemental electrical power resource. As will be appreciated by persons skilled in the art of electrical power generation and distribution, systems and practices according to the exemplary embodiments can reduce the need to expend other resources on constructing, operating and maintaining dedicated back-up power generation resources.

Systems and methods according to various exemplary embodiments include, among other features, aggregation of real-time EV ancillary capability information from a plurality of participating EVs coupled to a power grid for purposes of charging the EV batteries, and from the aggregated real-time EV ancillary capability information generating offers for ancillary services and sending the offers to power generating entities.

As will be appreciated by persons of ordinary skill in the art from the present disclosure, the aggregation of real-time EV ancillary capability information from a large number of EVs and, according to the exemplary embodiments, generation of offers for ancillary services based on the aggregated real-time information provides for reliability of the offers and for maximizing the amount (e.g., kilowatts) of ancillary services that can be offered to the power generating entities. Such persons will understand from reading the present disclosure that the exemplary embodiments can provide a maximizing of the amount of ancillary services that can be reliably offered by basing the offers on the real-time EV ancillary capability information being received from the participating EVs while these are coupled to the power grid. As will be appreciated by such persons, practices according to the exemplary embodiments, by maximizing of the amount of ancillary services that can be reliably offered through basing the offers on the real-time EV ancillary capability information can, among other benefits, increase the value of the ancillary services offers to the power generating entities. This increase in the value of the ancillary services offers can, as will also be appreciated by such persons, provide increased compensation to the participating EV owners.

Systems and methods according to various exemplary embodiments include, among other features, aggregating in real-time EV energy demand information from EVs and EVSEs, receiving energy offers for EV charging from power generation units or other electric power providers, and also include automatic lowest cost auctioning matching of the EV energy demand information from the EVs and EVSEs with offers of electricity from electric power providers. In one aspect, the perspective of "lowest cost" can be from the view of the EV owners and operations, i.e., demand side. Electric power providers can, for example, be large utility companies having coal-fired or nuclear powered steam-turbine electrical power generating resources, or large-scale wind farms or solar power farms, and can be smaller independent power generating companies, and can be consortia of smaller independent power generating companies.

FIG. 1 is a high level functional schematic of one example EV charging and ancillary service auction system 100 according to one or more exemplary embodiments. The EV charging and ancillary service auction system 100 can include a plurality of electric vehicles, for example EV 102A, EV 102B and EV 102C (generically referenced in the in the singular sense as "an EV 102" and in the plural sense as EVs 102"). The EVs 102 are shown in a stationary mode, with EV 102A connected to EVSE 104A, and EV 102B connected to EVSE 104B. EV 102C is an example EV having an on-board charging equipment (not explicitly shown in FIG. 1) capable of plugging into an electrical outlet 106, e.g., a 110 volt or 220 volt, 60 cycle outlet. The EVSE 104A and EVSE 104B (generically referenced in the singular sense as "an EVSE 104" and in the plural sense as EVSEs 104") are each shown with one EV 102 connected, but this is only to avoid unnecessary graphical complexity, and it will be understood that EVSE 104 can represent a centrally controlled, multiple charging station EVSE facility (not specifically shown) such as can be installed in, for example, planned public charging stations or an apartment parking garage.

A grid 108, of which a representative portion is depicted, distributes or is capable of distributing electric power from N power generators, labeled 110-1, 110-2, 110-3 . . . 110-N (generically referenced in the singular sense as "a power generator 110" and in the plural sense as "power generators 110"), to the ESVE 104A and ESVE 104B, and to the electric outlet 106. The grid 108 is intended to represent any scale of power grid, for example a regional power grid or the entire North American grid. Also, the particular equipment, e.g., type and arrangement of step-up and step-down transformers (not shown), implementing the grid 108 is not particular to the embodiments and, therefore, description of such is omitted.

Referring still to FIG. 1, an Aggregator 112 is shown and, in an aspect, can be real-time linked to the EVs 102 and to the EVSEs 104 and linked to an ISO (or Independent System Operator as previously described) 114. In accordance with the definitions hereinabove, the Aggregator 112 can be a market entity such as, without limitation, a business unit within a utility (e.g., Con-Edison or Dominion Power), a business entity wholly separate from any utility, or a governmental organization or agency. It will be understood that these are only examples and are not intended to be any limitation on any embodiment, or any aspect of any embodiments. Further in accordance with the definitions hereinabove, connections (e.g., links) to and from the Aggregator 112 are intended to encompass end points, such as, without limitation, Internet end-points of web servers (not shown) controlled by, or operated on behalf of the Aggregator 112 for purposes of performing operations pertaining to the Aggregator 112 functions or related operations described herein, Referring to FIG. 1, one linking of the Aggregator 112 to the EVs 102 and a similar linking of the Aggregator 112 to the EVSEs 104 can be formed by, but is not limited to, the real-time communication link 116A between EV 102A and the Internet 118. One linking of the Aggregator 112 to the ISO 114 can be formed by, but is not limited to, the real-time communication link 120 between the Internet 118 and the Aggregator 112, and the communication link 122 between the Aggregator 112 and the ISO 114. In one aspect, the communication link 122 between the Aggregator 112 and the ISO 114 may be a real-time communication link. In another aspect, the communication link 122 may be slower, or may have a greater latency, than a real-time communication link.

An example linking of the EVs 102, EVSEs 104, the Aggregator 112 and the ISO 114 can also include the real-time communication link 116B between EV 102C and the Internet 118, and can also include the real-time communication link 124A between EVSE 104A and the Internet 118 and the real-time communication link 124B between EVSE 104B and the Internet 118. It will be understood that the Internet 118 is only an example network for establishing real-time communication paths (not specifically shown) between each of the real-time communication links 116A, 116B, 124A, 124B and the real-time communication link 120 to the Aggregator 112, and is not intended to limit the scope of any of the exemplary embodiments to having such real-time communication paths formed through the Internet.

As previously described, FIG. 1 shows the EVs 102 in a stationary mode, with EV 102A connected to EVSE 104A, and EV 102B connected to EVSE 104B. It will be understood that the exemplary embodiments are not limited to practice with only stationary EVs 102. On the contrary, the invention contemplates embodiments utilizing communications between an EV 102 and the Aggregator 112 while the EV 102 is moving. For example, in an aspect a moving EV 102 can communicate to the Aggregator 112 updates as to charge condition and location. In a related aspect the Aggregator 112, or another entity, can communicate location-specific and time-specific offers for electrical charging services to the moving EV 102.

Referring still to FIG. 1, it will be understood that the real-time communication links 116A, 116B, 120, 124A and 124B may be realized in any physical medium, e.g., wired, optical fiber, or wireless, or any combination of such physical media. The real-time communication links 116A, 116B, 120, 124A and 124B, as well as the communication links 122 and 126 can be formed on, or carried by, for example, wireless cellular (e.g. CDMA, EV-DO, GSM, UMTS, LTE, WiMAX), Wireless Local Area Networks (e.g. WLAN/802.11), as well as wired Internet transmission media (e.g. Ethernet, xDSL, cable, fiber). The real-time communication links 116A, 116B, 124A and 124B may, in addition, use any one or more the various protocols capable of carrying the described communications in real-time. Examples of such protocols can include, but are not limited to, connection-based communication protocols, such as Asynchronous Transfer Mode (ATM) and/or Transfer Control Protocol (TCP), and can include, but are not limited to, connectionless packet switching communication protocols, such as Universal Datagram Protocol (UDP). It will be understood that the above-identified example implementations of the real-time communication links 116A, 116B, 124A and 124B are only examples, and are not intended to limit the scope of any exemplary embodiment or any aspect of any exemplary embodiment. On the contrary, any known or later developed link protocol may be employed that is capable of carrying the described information pertaining to EV electric charge demand or EV ancillary services capacity from what may be a large number of EVs 102, and a large number of EVSEs 104, many of which may be moving, or at various different and changing locations, to the Aggregator 112.

Referring still to FIG. 1, in one aspect a user, for example an owner or operator of an EV 102, can initiate an EV charge request by various means and methods, examples of which are described in greater detail at later sections. In response, as will also be described in greater detail, the EV 102 or the EVSE 104 generates and sends an EV energy demand information, alternatively referenced as "EV energy demand data," to the Aggregator 112. The Aggregator 112 can receive the EV energy demand information, from EVs 102 and EVSEs 104, in real time, for example over one or more the real-time communication links 116A, 116B, 124A and 124B, through the Internet 118 and then on the real-time communication link 120. The Aggregator 112 then, in one aspect, aggregates the EV energy demand information and generates corresponding aggregated EV energy demand information (alternatively referenced as "aggregated EV energy demand data"). In an aspect, the Aggregator 112 can send the aggregated EV energy demand data over, for example, the communication link 122, to the ISO 114. In one aspect, both during receiving and prior to receiving the aggregated EV energy demand information from the Aggregator 112, the ISO 114 can receive, for example over communication link 126, EV charging service offers from one or more of the power generators 110. The EV charging service offers may, for example, include price and quantity parameters specifying, for example, one or more steps in terms of quantity of charge (e.g., in kilowatts) and corresponding price (e.g., in cents per kilowatt-hour). In a further aspect the ISO 114 can match the aggregated EV energy demand information with the EV service offers, in a lowest-cost (e.g., from the perspective of the EV 102 owner or operator).

Referring still to FIG. 1, in an aspect, the ISO 114 can send EV energy demand-offer matching information to the Aggregator 112 representing, or characterizing the matches of aggregated EV energy demand information with EV charging service offers from the power generators 110. In a further aspect the Aggregator 112 can manage EV charge service transactions based on, and in accordance with, the EV energy demand-offer matching information received from the ISO 114. The Aggregator 112 management of EV charge service transactions can, in one aspect, include control of the charging of EVs 102 within parameters specified by the EV energy demand-offer matching information received form the ISO 114, and settling of payment from the owner or operator of the EVs 102 being charged, to the ISO 114 or to one or more of the power generators 110. In one aspect, the Aggregator 112 can control the charging of the EVs 102 by sending charge enabling information to corresponding EVSEs 104. In another aspect, the Aggregator 112 can include in settling of payment from the owner or operator of the EVs 102 being charged a payment of, for example, a percentage fee to an entity associated with the EVSE 104A. In another aspect, described in greater detail at later sections, the Aggregator 112 can settle, for example via communications between the Aggregator 112 and the ISO 114 over the communication link 122 and over real-time communication links 116 or 124 with one or more EVs 102 or EVSEs 104, settling payment to the owners of EV 102 in exchange for sale of ancillary services.

Referring still to FIG. 1, in a further aspect, transaction communications (not explicitly shown in FIG. 1) may be exchanged between the Aggregator 112, EV 102C, and/or the ISO 114, over real-time communication link 116B, and EV 102C settling a payment by the EV 102C to an entity associated with, for example, one of the power generators 110.

As previously described, exemplary embodiments can include various means and methods for a user associated with an EV 102 (e.g., an owner or operator of an EV 102) to initiate an EV charging operation. In one aspect such a user, after plugging the EV 102 into an EVSE 104 or into an electrical plug 106, can indicate to his or her computer (not shown in FIG. 1) that an EV charging operation is desired and, in response, be presented with a graphical user interface (GUI) (not shown in FIG. 1), for example a web site (not shown in FIG. 1) associated with the ISO 114. The GUI may, for example, have a click field (not shown in FIG. 1) for requesting EV charging services.

It will be understood that visiting the web site was only one example initiation of requesting charging of an EV 102 in practices according to the exemplary embodiments. One example alternative implementation can be a "start transaction" button, or other user interface, for example a fob or card swipe sensor, on an EVSE 104. In another example alternative, the user can initiate the transaction simply by plugging the EV 102A into the EVSE 104A.

Referring still to FIG. 1, in one aspect, in response to the user initiating an EV charging transaction, for example by any of the previously described means, the EVSE 104 can, in response, communicate with the EV 102A to obtain parameters characterizing or otherwise relating to the demand for electric charging services. For example, the parameters may include capacity parameters characterizing the capacity of the EV 102 storage battery, and charge state parameters indicating present state of charge of the EV storage battery. In an aspect, the EV 102 or the EVSE 104 can, based on the above-described communication of information, generate an EV energy demand information. The EV energy demand information may be a packet, for example an STMP packet message, having a subscriber identifier (ID) (not shown) that can be unique to the EV 102A or to the user and parameters describing a particular charging demand. The EV energy demand information can be addressed, for example as per TCP/IP protocol, to a URL or equivalent, associated with the Aggregator 112.

Methods and systems according to one or more exemplary embodiments can further provide for the EVs 102 to participate in spot wholesale market for ancillary services.

Figure 2:
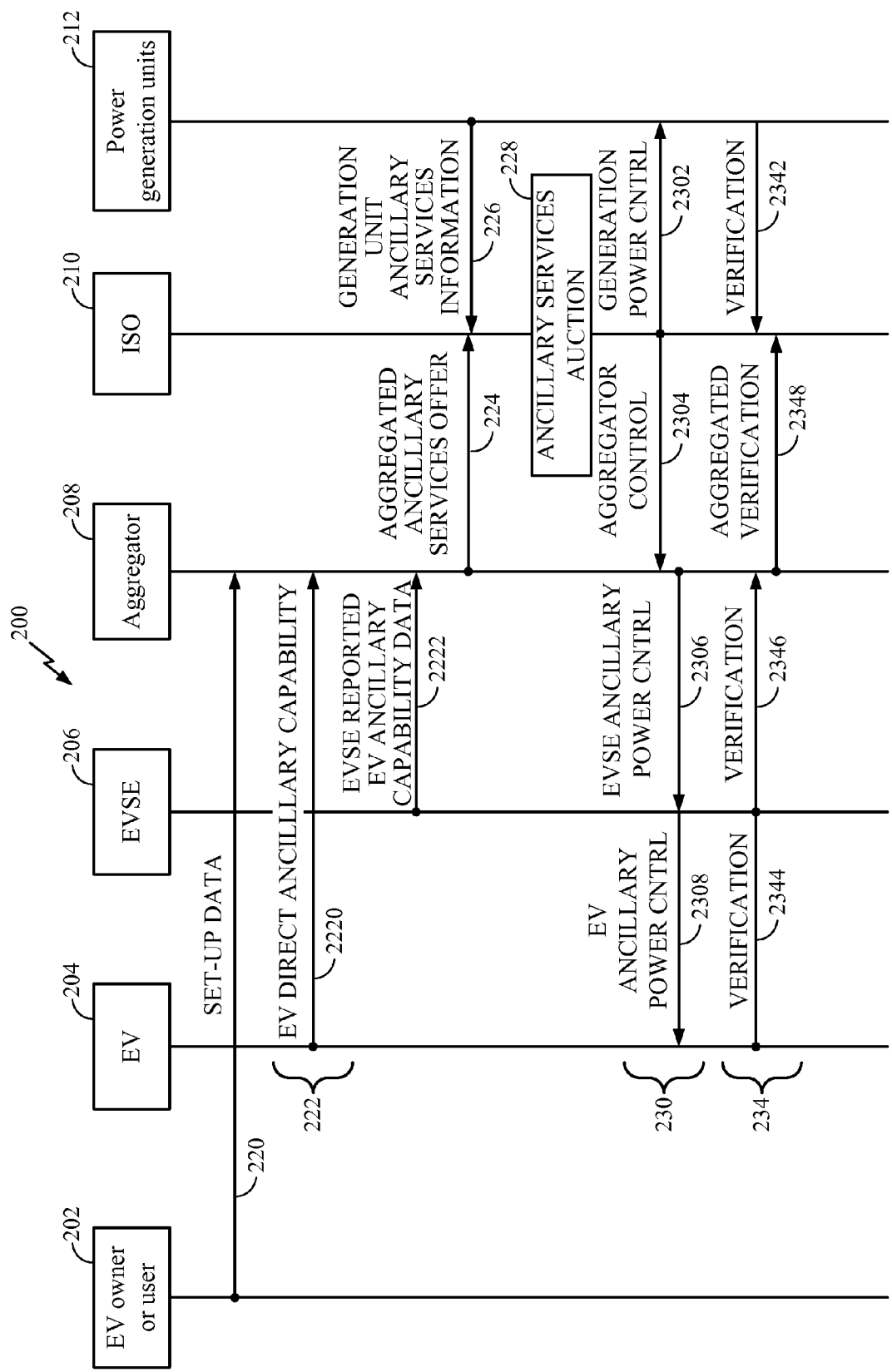
FIG. 2 shows one example flow diagram of one ancillary service bid and EV ancillary capability aggregation and auction according to one exemplary embodiment.

Referring to FIG. 2, example operations and aspects of a process 200 according to one exemplary embodiment for auctioning EV ancillary services will be described. Example operations and aspects are described in reference to an EV owner or user 202, an EV 204, an EVSE 206, an Aggregator 208, and ISO 210 and one or more power generating units 212. Referring to FIGS. 1 and 2 together, an EV owner or user 202 may be, but is not necessarily, an owner or user of any of the example EVs 102 Likewise, the described EV 204 can be, but is not necessarily, embodied by any of the EVs 102, i.e., any of EV 102A, 102B or and 102C. The described EVSE 206 may be, but is not necessarily, embodied by any of the EVSEs 104. Continuing to refer to FIGS. 1 and 2 together, the Aggregator 208 can be, but is not necessarily, embodied by the FIG. 1 Aggregator 112, and the FIG. 2 ISO 210 can be, but is not necessarily, embodied by the FIG. 1 ISO 114.

Referring still to FIG. 2, one example feature of process 200 can include a set-up data communication at 220 from the EV owner or user 202 to the Aggregator 208. The set-up data communication at 220 may include the EV owner or user 202 logging into a web-site associated with the Aggregator 208 and being presented, for example vie conventional HTML browser session, a conventionally generated HTML-based graphical user interface (not shown in FIG. 2) having, for example, self-explanatory pull-downs and fillable fields. The HTML browser may, for example, be installed as a client in a personal computing device (not shown in FIG. 2) owned by or otherwise accessible to the EV owner or user 202. Such a personal computing device may be a feature of the EV 204, or may be a "smart-phone" or equivalent portable personal computing device having a display and data entry means (e.g., touch-screen and/or physical keypad). In an aspect the means for the EV owner or user 202 to enter the set-up data can be a dedicated user interface (not shown in the figures) installed in the EV 204, on the EVSE 206, or in another location accessible to the EV owner or user 202.

Referring still to FIG. 2, set-up data received from the EV owner or user 202 and communicated at 220 to the Aggregator 208 can include, for example, a user-profile data (not separately shown in the figures) and a charge session data (not separately shown in the figures). The user profile data within, or associated with the set-up data can include, for example, a unique username, a password, and/or a data uniquely identifying one or more EVs 204. In an aspect, user-profile data can further include the EV owner or user 202's preferred mode of receiving payment for his/her EV 204 actually providing ancillary services or, in a further aspect, for agreeing to make his/her EV 204 available for ancillary services. In one aspect, the user's preferred mode of payment can specify among money or energy credits for later use in purchasing charge services. In a further aspect the energy credits may be designated as being immediately redeemable by the EV owner or user 202, for example as an offset to the cost to the EV owner or user 202, either from the ISO 210 or the power generating units 212, for a charging service that the EV 204 will receive while plugged in to the EVSE 206 (or to a power outlet such as the FIG. 1 EV 102C).

In one aspect, instead of the EV owner or user 202 entering or submitting the above-described user-profile information each time he or she wishes to charge his or her EV 204, the EV owner or user 202 can enter or submit the user-profile information by subscribing (not specifically shown) to an ancillary services subscription plan. In one example ancillary services subscription plan according to this aspect, a user profile and preferences record (not shown) can be maintained for each EV owner or user 202 who is an individual subscriber. Further to the aspect, the set-up data at 220 may be included in the process (not specifically shown) of plugging the EV 204 into an EVSE 206 or, for example, by the EV owner or user 202 swiping a subscription card, or fob, or equivalent.

Referring still to FIG. 2, in an aspect the charge session data in the set-up data received from the EV owner or user 202 (or in whole or in part automatically communicated by the EV owner or user 202's EV 204 or by its currently used EVSE 206) and communicated to the Aggregator 208 at 220 can include, for example, hardware limitations or constraints on the EV 204 ancillary services capability. One example hardware constraint can be a maximum watt output from the EV 204 or from the EVSE 206. In an aspect, the charge session data in the set-up data received from the EV owner or user 202 and communicated to the Aggregator 208 as 220 can include programmable or selectable constraints such as, but not limited to, minimum prices, time of availability, EV battery minimum state of charge and desired EV range. It will be understood that "desired EV range," in this particular context, means the minimum remaining range of the EV 204 after provision of the ancillary services and without further charging. In a related aspect, some or all of the above-described hard constraints on an EV's ancillary services capability can be automatically included in the present EV ancillary services availability and capability information data that is communicated at 222 from the EV 204 and/or from the EVSE 206 to the Aggregator 208, as described in greater detail below.

Continuing to refer to FIG. 2, in one example according to the process 200, after the set-up data at 220, or as a first action if the Aggregator 208 has already been provided with, or has alternative access to the above-described enrollment information, the process 200 can send to the Aggregator 208 an EV present ancillary capability information, either, at 222 as an EV direct ancillary capability communication 2220 from the EV 204 or as an EVSE reported EV ancillary capability communication 2222 from the EVSE 206. The EV present ancillary capability information can indicate, in one aspect, the present charge state of the EV 204 battery (not separately indicated by the FIG. 2 graphics) and, in one example, the power capacity of the EV 204. It will be understood that "power capacity of the EV 204," in this particular context, means the power delivery capacity, for example in terms of kilowatts. As will be understood by persons of ordinary skill in the art upon reading this disclosure, the power delivery capacity of the EV 204 may be limited by various factors, for example battery technology, charging capabilities or characteristics of the EVSE 206, and circuitry feeding the EVSE 206.

Referring to FIGS. 1 and 2 together, examples of EV direct ancillary capability communication 2220 and EVSE reported EV ancillary capability communication 2222 will be described. One example of the EV direct ancillary capability communication 2220 can be the FIG. 1 EV 102A sending the above-described EV ancillary capability information over FIG. 1 real-time communication link 116A, through the Internet 118, and through the FIG. 1 real-time communication link 120 to the Aggregator 112. One example FIG. 2 EVSE reported EV ancillary capability communication 2222 can be the FIG. 1 EVSE 104A sending, to the Aggregator 112, the EV present ancillary capability information related to the EV 102B that is plugged into the EVSE 104B. This sending may be, for example, over the FIG. 1 real-time communication link 124A, through the Internet 118, and through the real-time communication link 120. Referring still to FIGS. 1 and 2 together, in another example of a FIG. 2 EV direct ancillary capability communication 2220, the FIG. 1 EV 102C can send its EV present capability information to the Aggregator 112 over real-time communication link 116B, through the Internet 118, and through the real-time communication link 120 to the Aggregator 112.

Referring to FIG. 2, in the example according to the process 200 described above, the communicating at 222 of EV ancillary capability information to the Aggregator 208 was only for one EV 204. According to one exemplary embodiment the above-described communicating at 222 of EV ancillary capability information to the Aggregator 208 can be within an aggregating period during which the Aggregator 208 receives in real time, and aggregates, EV present ancillary capability information received from what can be a large number of EVs 204 coupled to the power grid. The aggregating period can, for example, be a sliding window of time of a duration WT. It will be understood that "WT" is an arbitrary label, having no inherent meaning.

It will be understood that in certain exemplary embodiments the aggregating period is not a required condition. For example, in one or more exemplary embodiments the Aggregator 208 can use usage statistics and history information to offer ancillary services without need to establish any aggregating period.

In an aspect, the Aggregator 208 can maintain a running aggregation of the ancillary services capability of all participating EVs 204 and, for example at instances related to an aggregating period, or related to usage statistics and history information, the process 200 goes to 224 to generate another aggregated ancillary services offer, based on the new snapshot of the running aggregation of the ancillary service. In one example, the aggregated ancillary services offer communicated at 224 can be an amount (e.g., number of kilowatts) and duration of power. In one specific example, the aggregated ancillary services offer communicated at 224 can include a kilowatt number and a duration number, for example DV kilowatts can be delivered to the electric power grid for MV units of time. It will be understood that "DV" is an arbitrary label, having no inherent meaning.

In one aspect, aggregated ancillary services offers communicated at 224 can overlap. For example, an aggregated ancillary services offer to provide frequency regulation can overlap with an aggregated ancillary services offer for power capacity (i.e., both the frequency regulation offer and the power capacity offer can be valid at the same time).

It will be appreciated by persons of ordinary skill in the art that the process 200 according to the exemplary embodiments, by generating the aggregated ancillary services offer communicated at 224 based on real-time aggregation of EV ancillary capability information, for example over the most recent duration WT, or otherwise based on recent usage statistics and history information, can generate a statistically more reliable aggregated ancillary services offer than can be generated otherwise. It will be understood that, in this context, "reliable" means that the ancillary services offered will actually be available.

It will also be appreciated by persons of ordinary skill in the art that the process 200 according to the exemplary embodiments, by generating the aggregated ancillary services offer communicated at 224 based on real-time aggregation of EV present ancillary capability information, collected over the most recent duration WT, or otherwise based on recent usage statistics and history information, can generate an aggregated ancillary services offer having a higher offered quantity of ancillary services, e.g., more kilowatts, than can be otherwise generated.

Continuing to refer to FIG. 2, in one example according to the process 200, concurrent, in whole or in part, with the running aggregation maintained by the Aggregator 208 for generating and communicating at 224 to the ISO 210 the aggregated ancillary services offers, the Aggregator 208 can at 226 receive generation unit ancillary services information from the power generation units 212. Referring to FIGS. 1 and 2 together, one example communication at 226 of generation unit ancillary services offers can be performed over the communication link 122.

Referring to FIG. 2, in one example according to the process 200, after the ISO 210 receives the aggregated ancillary services offer communicated at 224 and the generation unit ancillary services information communicated at 226 from the power generating units 212, the ISO 210 performs at 228 an ancillary services auction. For purposes of demonstrating concepts one example hypothetical operation of an ancillary services auction at 228 can have a form such as, or comparable to, the following example hypothetical, which assumes that a grid such as the FIG. 1 grid 108 is running out of capacity (peak demand) and an ISO such as the ISO 114 of FIG. 1 or ISO 210 of FIG. 2 needs to increase spinning reserves to prevent a blackout: The hypothetical's ISO calls for 10 MW of additional power capacity during the next hour. The hypothetical's Aggregator offers 7 MW at $100/MW and, concurrently, hypothetical Power Generation Unit 1 offers 10 MW at $110/MW, and hypothetical Power Generation Unit 2 offers 10 MW at $120/MW. Continuing with the example hypothetical, the described hypothetical's ISO runs an auction according to the FIG. 2 auction 228 and, further to exemplary embodiments, can assign a contract of 7 MW to the hypothetical's Aggregator at $100/MW and 3 MW to the hypothetical's Power Generation Unit at $110/MW during the next hour.

Referring to FIG. 2, in one example according to the process 200, after the ISO 210 performs the ancillary services auction at 228, the ISO initiates ancillary services control command communications 230 that reach the power generating unit 212, the EVSE 206 of each participating EV 204 and, through the EVSE 206, each participating EV 204. In one example, the ancillary services control command communications at 230 can include a generation of power control communication at 2302, which generates and communicates power generation unit ancillary services control commands, from the ISO 210 to the power generation unit 212 having the ancillary services requirement that, at the ancillary services auction 228, matched the aggregated ancillary services offer communicated at 224. Referring to FIGS. 1 and 2 together, one example communication at 2302 of power generation unit ancillary services control commands can be over the communications link 126 from the ISO 114 to the power generators 110.

Referring to FIG. 2, one example ancillary services control command communication at 230 can also include an aggregator ancillary services control command communication at 2304, from the ISO 210 to the Aggregator 208, and a resulting plurality of EVSE ancillary services control command communications at 2306, from the Aggregator 208 to the EVSE 206 to which each EV 204 that was a participating EV 204 with respect to the aggregated ancillary services offer that was matched to the ancillary services requirement by the ancillary services auction at 228. The purpose and function of the aggregator services control command communication at 2304 is to manage, for example by effectuating control of circuitry in the EV 204 or EVSE 206, how much power the EV 204 batteries should deliver to the power grid. It will be understood by persons of ordinary skill in the art upon reading this disclosure that the specific content and the specific format of the aggregator ancillary services control command communication at 2304 can be application specific depending, for example, on specific circuitry (not shown) of the EV 204 and EVSE 206.

In one aspect, an aggregator control command communication at 230 can be performed upon a match being identified and a corresponding contract being formed in the auction at 228, prior to the contract-specified ancillary services actually being required. To illustrate, one hypothetical example of such an aggregator control command communication at 230 may be of the following hypothetical type: "limit maximum EV battery charge at 95% of capacity during the next 8 hours." In another aspect, an aggregator control command communication at 230 can be performed when the ancillary services specified in the contract are actually required by the ISO 210. To illustrate, one hypothetical example of such an aggregator control command communication at 230 may be of the following hypothetical type: "discharge 1.5 kW until stop signal arrives."

Referring to FIGS. 1 and 2 together, one example communication at 2304 of aggregator ancillary services control commands can be over the communications link 122 between the Aggregator 112 and the ISO 114. Still referring to FIGS. 1 and 2 together, one example communication at 2306 of EVSE ancillary services control commands can be over the real-time communications link 120 from the Aggregator 112 to the Internet 118, through one or more real-time communication paths (not separately shown) through the Internet 118, and over one or more of the real-time communication links 124 between the Internet 118 and the EVSEs 104.

Referring again to FIG. 2, in one example process 200 one example ancillary services control command communication at 230 can include an EV ancillary power control command communication at 2308 from each EVSE 206 that received an EVSE ancillary services control command communications at 2306 to the participating one or more EVs 204 that are plugged into that EVSE 206. It will be understood that in instances in which multiple participating EVs 204 are plugged into the same EVSE 206 that one EVSE ancillary services control command communication at 2306, from the Aggregator 208 to that one EVSE 206, that the EVSE 206 may, in turn send multiple EV ancillary power control command communications at 2308, namely an EV ancillary services control command to each participating EV 204. Referring to FIGS. 1 and 2 together, one example means for EV ancillary power control command communication at 2308 can be over the communication path (shown but not separately numbered) between the EVs 102 and EVSEs 104.

Referring again to FIG. 2, in one example according to the process 200, in response to above-described example communications within the described ancillary services control command communications at 230, each of the power generation unit 212, the participating EVs 204 and the EVSEs 206 of participating EVs 204 that received a described ancillary service control command can send verification communications to the ISO 210. In one particular example, at 234, the power generation unit 212 that received the above-described power generation unit ancillary services control command at 2302 can send, at 2342, a power generation unit ancillary services control verification communication to the ISO 210. In a further one particular example, each participating EV 204 that received an EV ancillary power control command communication at 2308 can, at 2344, send to its associated EVSE 206 an EV ancillary services control verification communication and, at 2346, each EVSE 206 having an associated participating EV 204 can send to the Aggregator 208 an EVSE ancillary services control verification communication. In one particular example, the Aggregator 208 can, at 2348, after receiving the plurality of EVSE ancillary services control verification communications at 2346 can send to the ISO 210 an aggregated ancillary services control verification communication. In an aspect, included in the aggregated ancillary services control verification communication sent at 2348 is information generated by the Aggregator 208 reflecting the EVSE ancillary services control verification communications at 2346 received by the Aggregator 208.

Referring still to FIG. 2, in an aspect, one example process 200 the EVSE ancillary services control verification communications at 2346 can identify which, or indicate a percentage of, the participating EVs 204 associated with the sending EVSE 206 that, at 2344, sent the EVSE 206 an EV ancillary services control verification communication. For purposes of brevity, in describing further example operation relative to FIG. 2, the participating EVs 204 that sent at 2344 an EV ancillary services control verification communication will be referenced as "verified participating EVs 204." In a related aspect the Aggregator 208 includes, in the sending at 2346 to the ISO 210 of an aggregated ancillary services control verification communication, information indicating particular ones of, or what percentage of, the participating EVs 204 are verified participating EVs 204.

In one aspect, the ISO 210, either directly or indirectly through the Aggregator 208, can further qualify the verifications received from the participating EVs 204. Such further qualification can, for example, be performed to further ensure that the offered aggregate ancillary services can, in fact, be provided. Further to this aspect, the ISO 210 can maintain a detailed log of ancillary services delivered, or not delivered, by individual participating EVs 204. One example form of an entry in such a detailed log may have the form of the following simulated entry: "EV 102A [of FIG. 1] provided 1.5 kW of power between 1:12am and 1:27am." In a further aspect, the ISO 210 can maintain its own fleet of EVs 204 participating in the system, along with reference logs of the energy usage of these EVs 204. The ISO 210 can then compare the energy usage indicated by the detailed logs of the participating EVs 204 with the energy usage indicated by the reference logs.

As previously described and referring to FIG. 1, in various methods and systems according to one or more exemplary embodiments the Aggregator 112 receives, in real-time, EV ancillary capability information from the EVs 102, over the real-time communication paths 116 from the EVs 102 to the Internet 118, over the real-time communication paths 124 from the EVSEs 104 to the Internet 118, through real-time communication paths established through the Internet 118, and over the real-time communication link between the Internet 118 and the Aggregator 112. Because of the mobile nature of EVs 102 and the contemplated use of various networking technologies for implementing the real-time communication links 116, there may be encountered in certain applications an uncertainty as to whether the real-time communication paths 116 are, in fact, real-time. There may be, as well, at least in certain applications an uncertainty as to whether the real-time communication links 124, or the real-time communication paths (described but not explicitly shown) through the Internet 118 are, in fact, real-time.

However, as also described, in certain of the exemplary embodiments the Aggregator 112 provides matching of real-time demand information from EVs 102 with EV charging service offers from the power generators 110. As also described, the matching can be based, at least in part, on the real-time information.

Methods and systems according to one exemplary embodiment provide testing of the real-time communication links and, in response to detecting a failure, providing alternative communication links or alternative operating modes.

Figure 3:
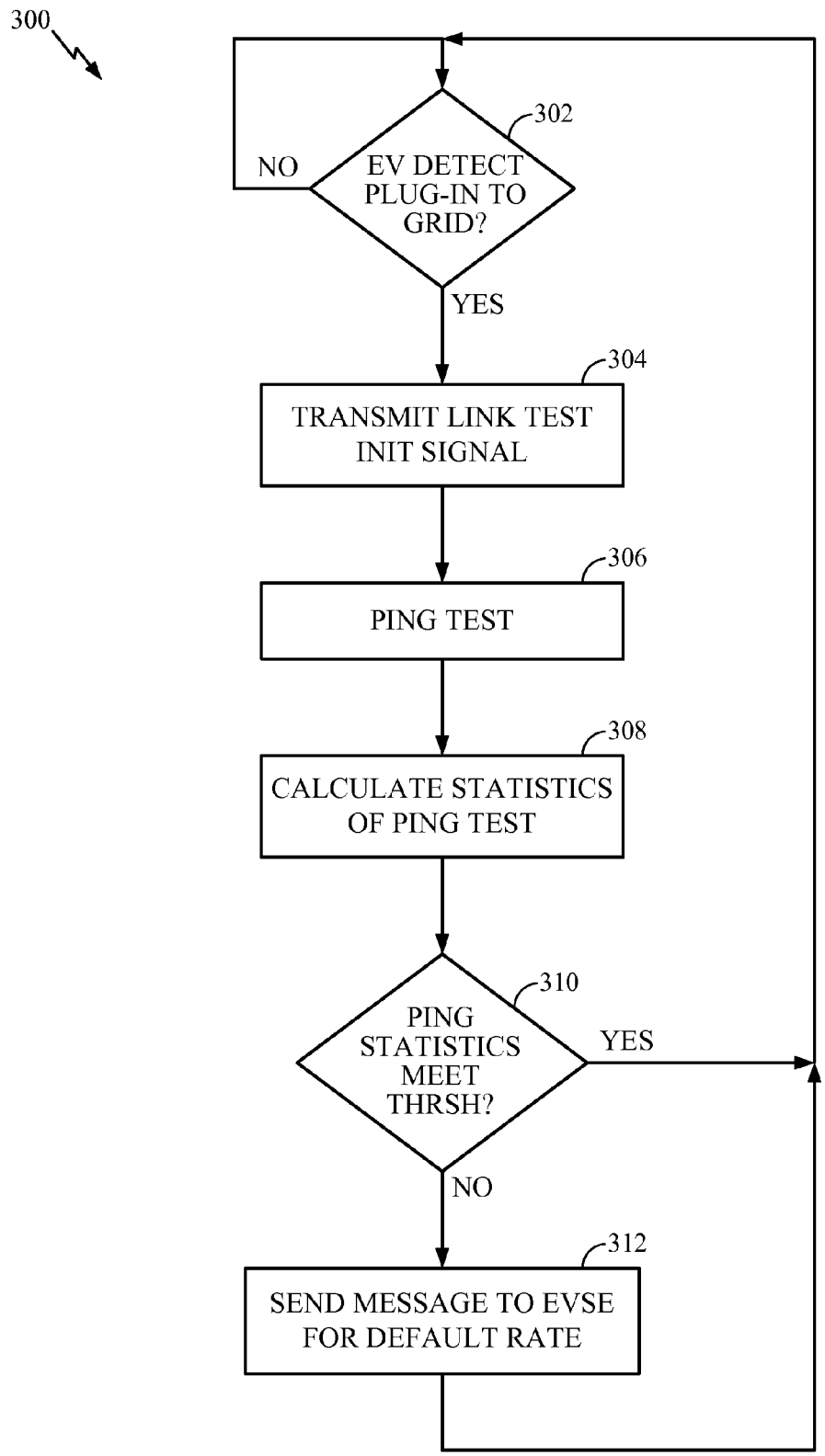
FIG. 3 shows one example flow diagram of a process for testing real-time communication links to EVs and EVSEs, and alternative operating mode aspect, according to one exemplary embodiment.

FIG. 3 shows one example process 300 according to one exemplary embodiment that provides testing of the real-time communication links and, in response to detecting a failure, switching to an alternative operating mode. Concepts according to the exemplary embodiment will be demonstrated by describing example operations of the FIG. 3 process 300 performed on the FIG. 1 example EV charging and ancillary service auction system 100. Certain example operations are also described in reference to the FIG. 2 process 200. It will be understood that description of example operations in reference to the FIG. 1 example EV charging and ancillary service auction system 100, or to the FIG. 2 process 200, is not intended to limit any of the embodiments, or to limit any aspect of any of the embodiments and, instead, is only for better focusing the description on novel concepts without unnecessary complexity of also describing further structure.

Referring FIG. 3, in describing one example process 300 it will be assumed that one or more EVs such as the FIG. 1 EVs 102 are enrolled in a subscription-type EV charging service and that an aggregator, such as the FIG. 1 Aggregator 112, includes or has access to a database of the enrolled EVs. The enrollment record for the one or more EVs can, for example, include information described in reference to the FIG. 2 enrollment at 220. It will be further assumed that each enrolled EV is configured to send a link test initiating signal to the aggregator, over a given communication link, each time the EV is plugged into an EVSE or electric outlet. The link test initiating signal may be a "here I am" or registration signal that the aggregator is configured to detect. In an aspect, the link test initiating signal may be sent by the EV over a link other than the real-time communication links, if any, between the EV at the location at which it is plugged in and the aggregator. In a further aspect the EV may be configured to transmit, as the link test initiating signal, wireless signals comparable to CDMA 2000 signals by which a conventional CDMA 2000 mobile unit registers with a mobile network.

With continuing reference to FIG. 3, one example process 300 can begin at 302 with detecting the EV plugging into an EVSE or outlet plug. Referring to FIG. 1, the detecting at 302 can be performed by, for example, the EV 102A being configured to detect being plugged into the EVSE 104A, or by the EV 102C being configured to detect being plugged into the outlet 106 to the power grid 108. In one example according to the process 300, in response to the detecting at 302 a link test initiating signal can be transmitted to the aggregator at 304. It will be understood that a signal may function as a link test initiating structure without being dedicated to that function. For example, the EV can be configured to send, in response to being plugged into an EVSE or output to the power grid, a general registration signal and the aggregator and EV may be configured to include in their registration protocol the real-time communication link test according to the FIG. 3.

Referring still to FIG. 3, in response to receiving the link test initiating signal sent by the EV at 304 the aggregator can go to 306 and perform a ping test. According to one or more embodiments, provision for the ping test can include assigning a URL or a direct IP address, depending on the Internet 118, to the EVs 102 and EVSEs 104. One example ping test at 306 can be a Q-repetition ping test, where Q is an integer. One example Q-repetition ping test can include initializing a counter (not shown), sending a first ping signal to the EV that at 304 sent the link test initiating signal and then waiting, for a pre-set time-out duration for a response. If a response is received the round trip time is measured and recorded. No response being received is detected as a no-response. In either event the counter is incremented by 1. The described sequence of sending the ping signal, measuring the round-trip time or detecting a no response, and incrementing the counter, is repeated until the count value is Q. In one example according to the process 300, after the ping test at 306 the aggregator can at 308 calculate the statistics of its results. Example calculated statistics at 308 can include a mean and maximum of the round-trip times. In one example according to the process 300, after calculating the statistics of the ping test at 308 the statistics can be compared at 310 to a threshold for determining a communication path as real-time or not real-time. In one further example according to the process 300, in response to the comparing at 310 indicating there is no real-time communication path to the EV that sent the link test initiating signal at 304 the aggregator can send at 312 messages to the EVSE allowing the EV to charge at usual residential or commercial rates and then return to 302.

Above-described example operations according to the process 300 do not explicitly describe applications in which there may be multiple communication paths between the EV at the location at which it is plugged into an EVSE or an outlet to the power grid and the aggregator. In one alternative embodiment, which may include the embodiment described above, if such multiple communications paths are available through various network technologies accessible to the EV, the aggregator can be configured to run individual tests to determine the optimal one of these networks to use. Various variables could be used in the determination of the optimal network path, such as network traffic, time of use, latency, required throughput, Aggregator preferences and desired Quality of Service (QoS). Communication network options include but are not limited to wireless cellular (e.g. CDMA, EV-DO, GSM, UMTS, LTE, WiMAX), Wireless Local Area Networks (e.g. WLAN/802.11) or wired Internet solutions (e.g. Ethernet, xDSL, cable, fiber).

It will be understood that exemplary embodiments shown by the FIG. 1 EV charging and ancillary service auction system 100 can be practiced without the Aggregator 112 having information characterizing the location of the EV 102 or of the EVSE 104, if any, to which the EV 102 is connected. It will also be understood that the exemplary embodiments shown by the FIG. 2 process 200 can be practiced without the Aggregator 208 having information characterizing the location of the EV 202 or of the EVSE 204, if any, to which the EV 204 is connected.

Various exemplary embodiments, which may be, but are not necessarily, according to one or more of the embodiments shown by or included in the FIG. 1 ancillary service auction system 100 or the FIG. 2 process 200, can further provide the aggregator (e.g., the FIG. 1 Aggregator 112 or the FIG. 2 Aggregator 208) the location of the EV associated with the EV ancillary capability information and the EV energy demand information. Among various benefits provided by the aggregator in systems and methods according to the exemplary embodiments having the location of the EVs associated with the EV ancillary capability information and the EV energy demand information are compensation of load resources based on Locational Marginal Pricing (LMP), or any equivalent location-based pricing or price adjustment scheme. LMP is known to persons of ordinary skill in the art pertaining to this invention and, therefore, except for description of example aspects of LMP that may be incidental to practices according to the exemplary embodiments, description of details of LMP is omitted. As known to such persons, LMP is based on the cost of supplying the next megawatt of load at a specific location or node. LMP takes into account bid prices for generation, the flow of power within the transmission system and power transfer constraints.

In an aspect, since the location of EVs such as the FIG. 1 EVs 102 can vary with respect to time, because of the significant number of EVs that might be charging at any point in time, the ISO (e.g., the FIG. 1 ISO 114) can authorize the aggregator (e.g., the FIG. 1 Aggregator 112) to provide a single virtual energy resource location. In a further aspect, the aggregator in methods and systems according to various exemplary embodiments can be configured to compute the virtual location of the EVs from which the aggregator receives EV ancillary capability information or EV energy demand information based on various variables, including but not limited to EV or EVSE geographic location, EV or EVSE power capacity, and actual charging power and others.

Figure 4:
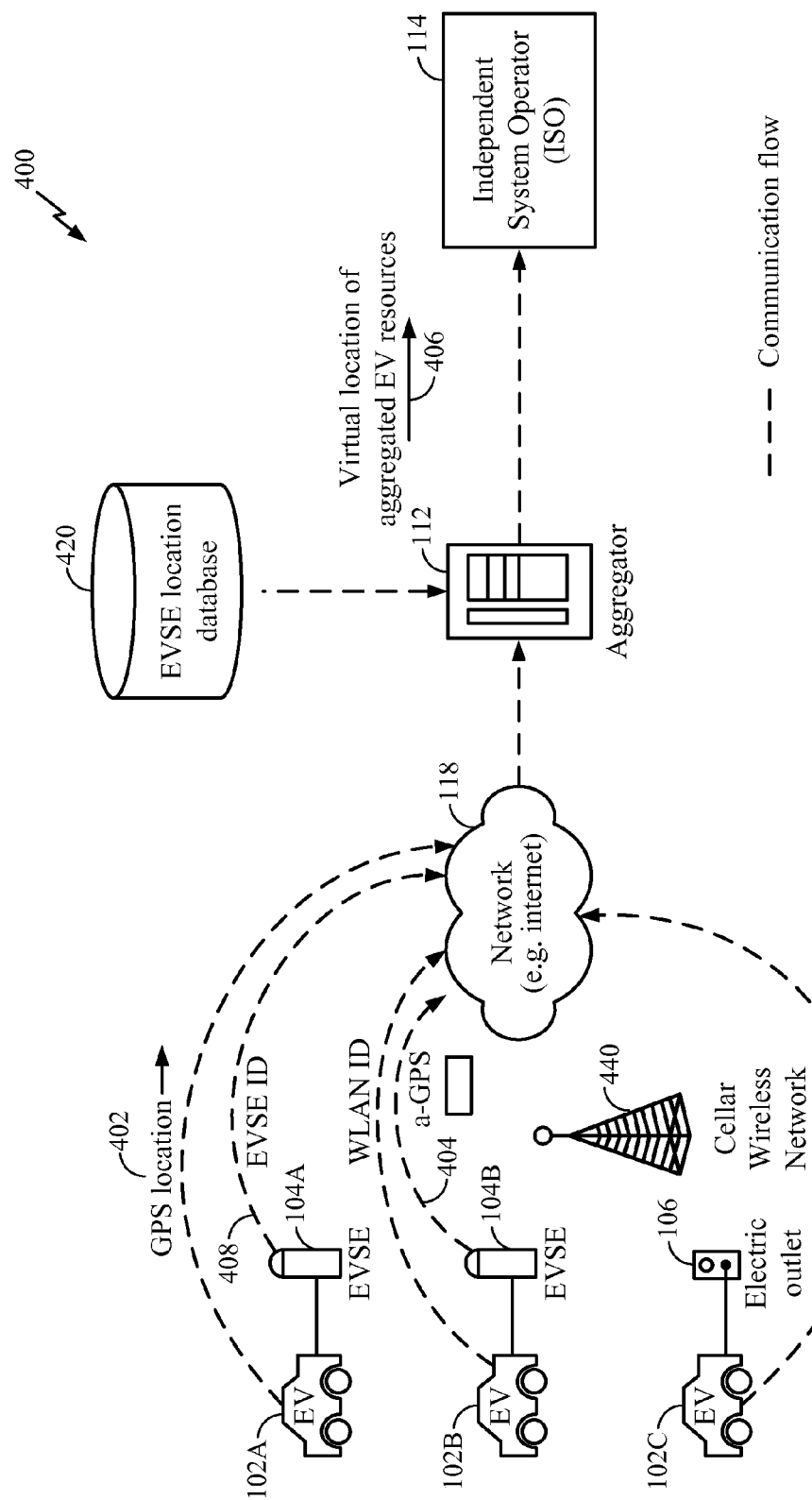
FIG. 4 is a simplified schematic of one EV electric service demand and ancillary service aggregation system, and related virtual location aspect, according to one exemplary embodiment.

FIG. 4 shows a simplified schematic diagram of one example EV charging and ancillary service auction system 400 on which various exemplary embodiments providing the aggregator with information to calculate the virtual location of EVs may be practiced. For purposes of focusing the description on novel aspects, the FIG. 4 example EV charging and ancillary service auction system 400 is shown with certain components common with the FIG. 1 EV charging and ancillary service auction system 100 and, for convenience of the reader, like components are given like labeling. It will be understood that the FIG. 4 simplified schematic diagram of one example EV charging and ancillary service auction system 400 omits depiction of the power generators 110 and communication link 126, and omits depiction of the power grid 108. It will be also be understood that the FIG. 4 example EV charging and ancillary service auction system 400 may include, and operate as previously described and as described in greater detail below, the power generators 110 coupled to the power grid 108, and the communication link 126 from, for example, the ISO 114 to the power generators 110.

Referring to FIG. 4, in an aspect an EV charging and ancillary service auction system 400 can provide the location, or an estimated location of the EVs 102 or EVSEs 104 associated with EV ancillary capability information that the Aggregator 112 collects in its aggregation function. In one further aspect, the EV charging and ancillary service auction system 400 can provide the Aggregator 112 with the location of EVs 102 and EVSEs 104 sending the EV ancillary capability information to the Aggregator 112 using various techniques, including but not limited to satellite-based global positioning systems, as shown by the EV GPS location information 402 indicating the location of EV 102A based on, for example, GPS or GLONASS. In a further aspect the EV charging and ancillary service auction system 400 can provide the Aggregator 112 with the location of EVs 102 and EVSEs 104 using Assisted-GPS, as shown by the example Assisted-GPS 404 indicating the location of EVSE 104B. In a further aspect, the Aggregator 112 in the EV charging and ancillary service auction system 400 can be configured to calculate, based on the location and estimated locations of EVs 102 and EVSEs 104 provided to it as described above, a single virtual location of aggregated EV resources, and as shown at 406 can send that location information to the ISO 114 for use in LMP determinations. EV GPS location information 402 indicating the location of EV 102A based on, for example, GPS or GLONASS.

Referring still to FIG. 4, in another aspect, the EV charging and ancillary service auction system 400 can provide the Aggregator 112 with the location of EVSEs 104 using identifiers for the EVSE 104 units and maintaining a database associating each of the identifiers with a geographical location. Persons of ordinary skill in the art can, in view of this disclosure, readily identify and implement means for establishing and maintaining such a database of EVSE IDs and associated geographical location information and, therefore, further detail description is omitted. One example of providing the Aggregator 112 with the location of EVSEs 104, using identifiers for the EVSE 104 units and maintaining a database, is shown by the EVSE 104A sending at 408 its EVSE ID to the Aggregator 112 via the Internet 118. The Aggregator 112 can then access the EVSE location database 420, for example in a content-addressable memory manner using the EVSE ID at 404 as an address.

Referring to FIG. 4, one or more of the EV GPS location information 402, the Assisted-GPS 404, and/or the EVSE ID 408 can be carried over one or more wireless links (not shown separately from the EV GPS location information 402, the Assisted-GPS 404 and EVSE ID 408) cellular mobile phone networks 440.

Continuing to refer to FIG. 4, as shown by the EV GPS location information 402 from the EV 102A to the Aggregator 112, in one aspect the Aggregator 112 may be provided with the geographical location of one or more of the EVs 102, instead of or in addition to being provided with the geographical location of the EVSEs 104 as previously described. In one further aspect, generation of the EV GPS location information 402 may be performed by means or methods embodying, or equivalent to, the Skyhook™ or other commercially available location systems that maintain a database of WiFi access points and their corresponding GPS locations, for example identifying the WiFi access points by their MAC addresses.

Figure 5:
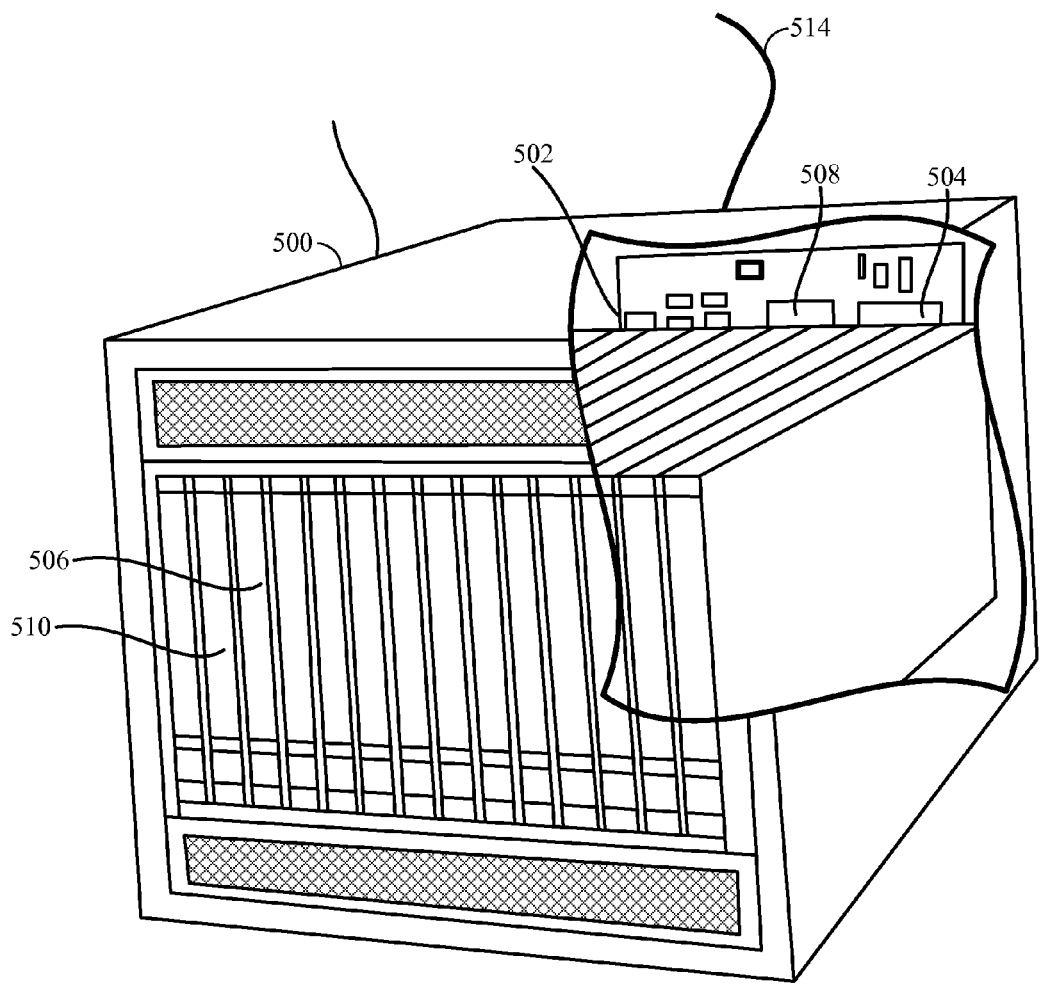
FIG. 5 is a block diagram of a computer capable of being particularly configured to embody an aggregator in an EV electric service demand and ancillary service aggregation system according to various exemplary embodiments.

In systems and methods according to various exemplary embodiments described above the aggregator, for example the Aggregator 112 of the FIG. 1 example EV charging and ancillary service auction system 100, or the FIG. 4 EV charging and ancillary service auction system 400, or the Aggregator 208 of the FIG. 2 example process 200, may be implemented using one or more particularly configured general purpose computers such as the FIG. 5 example computer system 500.

Referring to FIG. 5, the computer system 500 can include a processor 502 coupled to an internal memory 504 and to a large capacity nonvolatile memory, such as a disk drive 506. The computer system 500 can also include, as another large capacity non-volatile memory, a read-write optical disk drive 508 coupled to the processor 502. The computer system 500 can, in addition, include network access ports 510 coupled to the processor 502 for communicating with the network 514. The network 514 may be the Internet 118 shown in FIG. 1.

Referring still to FIG. 5, the processor 502 may be any programmable microprocessor, microcomputer or multiple processor chip or chips that can be configured by software instructions (applications) to perform a variety of functions, including the functions of the various embodiments described herein. In an aspect, software applications for performing one aggregator operations according to one or more of the described embodiments may be stored on a tangible medium readable by the processor 502, for example the disc drive 508.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A computer implemented method for real-time aggregating of electrical vehicle (EVs) energy capacity for real-time auctioning of ancillary services, comprising:
   receiving a set-up data identifying each of a plurality of participating EVs;
   aggregating, using a processor, in real time, EV energy capacity data from each of the plurality of participating EVs;
   generating, based on the EV energy capacity data, an aggregated ancillary services offer;
   communicating the aggregated ancillary services offer to an auction entity;
   testing whether an operability of a real-time communications link from an aggregator entity to one of the participating EVs fails to meet a given criterion; and
   if a result of the testing indicates the real-time communication link fails to meet the given criterion, enabling the charging of the participating EV at a default rate.

2. The method of claim 1, wherein aggregating, in real time, includes communicating the EV energy capacity data from at least one of the plurality of participating EVs over a real-time wireless link.

3. The method of claim 2, wherein the real-time wireless link is a wireless cellular communication link.

4. The method of claim 1, further comprising:
   aggregating, in real time, EV energy demand data from each of the plurality of the participating EVs; and
   generating and communicating to the auction entity, based on a result of the aggregating, at least one aggregated EV energy demand.

5. The method of claim 4, the method further comprising receiving from the auction entity an aggregator ancillary services control command indicating a matching of the aggregated ancillary services offer with an ancillary services requirement.

6. The method of claim 5, wherein at least one participating EV is identified as associated with the aggregated ancillary services offer indicated as matching the ancillary services requirement.

7. The method of claim 6, the method further comprising sending, to an EV support equipment (EVSE) associated with each of the at least one participating EVs, an EVSE ancillary services control command, the EVSE ancillary services control command indicating a control of the EVSE for delivering a power from a storage battery of the associated participating EV to a power grid.

8. The method of claim 7, the method further comprising receiving, from at least one of the at least one participating EVs and the EV support equipment (EVSE) associated with each of the at least one participating EVs, an EV verification information corresponding to the EVSE ancillary services control command.

9. The method of claim 8, the method further comprising sending to the auction entity an aggregated verification information based, at least in part, on the EV verification information.

10. The method of claim 9, the method further comprising settling a transaction payment to the at least one of the participating EVs identified as associated with the aggregated ancillary services offer indicated as matching the ancillary services requirement.

11. The method of claim 10, wherein settling the transaction payment is conditional on receiving the EV verification information from the at least one of the participating EVs.

12. The method of claim 4, the method further comprising:
   receiving, from the auction entity, an EV charging enablement data associated with an aggregated EV energy demand among the communicated aggregated EV energy demands and a matching EV charging service offer indicating an offering power generator; and
   controlling, based on the received EV charging enablement data, a charging of at least one of the participating EVs.

13. The method of claim 4, wherein the EV energy capacity data indicates a kilowatt power delivery capacity of the participating EV, and wherein the generating and communicating to the auction entity of at least one aggregated ancillary services offer is further based, at least in part, on the kilowatt power delivery capacity of the participating EVs associated with said aggregated ancillary services offer.

14. The method of claim 4, wherein the EV energy capacity data from at least one of the participating EVs includes a geographic location identifier indicating a geographic location of the participating EV, and wherein the generating and communicating to the auction entity at least one aggregated ancillary services offer is further based, at least in part, on the geographic location identifier of the participating EVs associated with said aggregated ancillary services offer.

15. The method of claim 14, wherein generating and communicating the aggregated ancillary services offer based at least in part on EV geographic location identifier from at least one of the participating EVs comprises:
  calculating a virtual location based on the EV location data; and
    including the virtual location with the aggregated ancillary services offer.

16. The method of claim 15, the method further comprising receiving from the auction entity an aggregator ancillary services control command indicating a matching of the aggregated ancillary services offer with an ancillary services requirement.

17. The method of claim 16, wherein at least one participating EV is identified as associated with the aggregated ancillary services offer indicated as matching the ancillary services requirement.

18. The method of claim 17, the method further comprising sending, to an EV support equipment (EVSE) associated with each of the at least one participating EVs, an EVSE ancillary services control command, the EVSE ancillary services control command indicating a control of the EVSE for delivering a power from a storage battery of the associated participating EV to a power grid.

19. The method of claim 18, the method further comprising receiving, from at least one of the at least one participating EVs and the EV support equipment (EVSE) associated with each of the at least one participating EVs, an EV verification information corresponding to the EVSE ancillary services control command.

20. The method of claim 1, wherein the real-time communications link is a wireless communications link.

21. The method of claim 20, wherein enabling the charging of the participating EV at the default rate includes communicating an indication to the participating EV of a default rate offer, over a secondary communication channel.

22. The method of claim 21, wherein the secondary communication channel is a text-messaging channel of a wireless cellular network.

23. The method of claim 1 wherein the EV energy capacity data indicates a kilowatt power delivery capacity of the participating EV, and wherein the generating and communicating to the auction entity of at least one aggregated ancillary services offer is further based, at least in part, on the kilowatt power delivery capacity of the participating EVs associated with said aggregated ancillary services offer.

24. The method of claim 1, wherein the EV energy capacity data from at least one of the participating EVs includes a geographic location identifier indicating a geographic location of the participating EV, and wherein the generating and communicating to the auction entity at least one aggregated ancillary services offer is further based, at least in part, on the geographic location identifier of the participating EVs associated with said aggregated ancillary services offer.

25. The method of claim 24, wherein generating and communicating the aggregated ancillary services offer based at least in part on EV geographic location identifier from at least one of the participating EVs comprises:
  calculating a virtual location based on the EV location data; and
    including the virtual location with the aggregated ancillary services offer.

26. The method of claim 1, wherein the criterion is a ping test.

27. The method of claim 1, wherein the criterion is a threshold round-trip time.

28. The method of claim 1, the method further comprising:
  determining an optimal real-time communications link, from a plurality of available real-time communications links, for use in communicating from the aggregator entity to one of the participating EVs.

29. A computer implemented method for real-time aggregating of electrical vehicles (EVs) charging, comprising:
  aggregating, using a processor, in real time, EV energy demand data from each of a plurality of the EVs;
  generating and communicating to an auction entity, based on a result of the aggregating, at least one aggregated EV energy demand;
  testing whether an operability of a real-time communications link from an aggregator entity to one of the EVs fails to meet a given criterion; and
  if a result of the testing indicates the real-time communication link fails to meet the given criterion, enabling the charging of the EV at a default rate.

30. The method of claim 29, the method further comprising:
  receiving, from the auction entity, an EV charging enablement data associated with an aggregated EV energy demand among the communicated aggregated EV energy demands and a matching EV charging service offer indicating an offering power generator; and
  controlling, based on the received EV charging enablement data, a charging of at least one of the EVs.

31. The method of claim 30, wherein aggregating, in real time, includes communicating EV energy demand data from at least one of the plurality of EVs over a real-time wireless link.

32. The method of claim 31, wherein the real-time wireless link is a wireless cellular communication link.

33. The method of claim 29, wherein the real-time communications link is a wireless communications link.

34. The method of claim 33, wherein enabling the charging of the EV at the default rate includes communicating an indication to the EV of a default rate offer, over a secondary communication channel.

35. The method of claim 34, wherein the secondary communication channel is a text-messaging channel associated with the real-time wireless cellular communication link.

36. The method of claim 29, wherein the criterion is a ping test.

37. The method of claim 29, wherein the criterion is a threshold round-trip time.

38. The method of claim 29, the method further comprising:
  determining an optimal real-time communications link, from a plurality of available real-time communications links, for use in communicating from the aggregator entity to one of the participating EVs.

39. An aggregator for real-time aggregating of electrical vehicle (EVs) energy capacity for real-time auctioning of ancillary services, comprising:
  means for receiving a set-up data identifying each of a plurality of participating EVs;
  means for aggregating, in real-time, EV energy capacity data from each of the plurality of participating EVs;
  means for generating, based on the EV energy capacity data, an aggregated ancillary services offer;
  means for communicating the aggregated ancillary services offer to an auction entity;

means for testing whether an operability of a real-time communications link from an aggregator entity to one of the participating EVs fails to meet a given criterion; and means for enabling, if a result of the testing indicates the real-time communication link fails to meet the given criterion, a charging of the participating EV at a default rate.

40. The aggregator of claim 39, wherein aggregating, in real time, includes communicating EV energy capacity data from at least one of the plurality of participating EVs over a real-time wireless link.

41. The aggregator of claim 39, the aggregator further comprising:

means for receiving from the auction entity an aggregator ancillary services control command indicating a matching of the aggregated ancillary services offer with an ancillary services requirement;

means for identifying at least one participating EV as associated with the aggregated ancillary services offer indicated as matching the ancillary services requirement; and means for sending, to an EV support equipment (EVSE) associated with each of the at least one participating EVs, an EVSE ancillary services control command, the EVSE ancillary services control command indicating a control of the EVSE for delivering a power from a storage battery of the associated participating EV to a power grid.

42. The aggregator claim 41, wherein the EV energy capacity data from at least one of the participating EVs includes a geographic location identifier indicating a geographic location of the participating EV, and wherein the generating and communicating to the auction entity at least one aggregated ancillary services offer is further based, at least in part on the geographic location identifier of the participating EVs associated with said aggregated ancillary services offer.

43. The aggregator of claim 42, wherein generating and communicating the aggregate ancillary services offer based at least in part on the EV location data from at least one of the EVs comprises:

calculating a virtual location based on the EV location data; and including the virtual location with the aggregated ancillary services offer.

44. The aggregator of claim 39, the aggregator further comprising:

means for aggregating, in real time, EV energy demand data from each of the plurality of the participating EVs; and means for generating and communicating to the auction entity, based on a result of the aggregating, at least one aggregated EV energy demand.

45. The aggregator of claim 44, the aggregator further comprising:

means for receiving, from the auction entity, an EV charging enablement data associated with an aggregated EV energy demand among the communicated aggregated EV energy demands and a matching EV charging service offer indicating an offering power generator; and means for controlling, based on the received EV charging enablement data, a charging of at least one of the participating EVs.

46. The aggregator of claim 44, the aggregator further comprising means for sending, to an EV support equipment (EVSE) associated with each of the at least one participating EVs, an EVSE ancillary services control command, the EVSE ancillary services control command indicating a control of the EVSE for delivering a power from a storage battery of the associated participating EV to a power grid.

47. The aggregator of claim 46, the aggregator further comprising means for receiving, from at least one of the at least one participating EVs and an EV support equipment (EVSE) associated with each of the at least one participating EVs, an EV verification information corresponding to the EVSE ancillary services control command.

48. The aggregator of claim 39, wherein the real-time communications link is a wireless communications link.

49. The aggregator of claim 48, wherein enabling the charging of the participating EV at the default rate includes communicating an indication to the participating EV of a default rate offer, over a secondary communication channel.

50. The aggregator of claim 49, wherein communicating the indication over the secondary communication channel includes communicating over a text-messaging channel of a wireless cellular network.

51. The aggregator of claim 39, wherein the EV energy capacity information indicates a kilowatt power delivery capacity of the participating EV, and wherein the generating and communicating to the auction entity of at least one aggregated ancillary services offer is further based, at least in part, on the kilowatt power delivery capacity of the participating EVs associated with said aggregated ancillary services offer.

52. The aggregator of claim 39, wherein the EV energy capacity data from at least one of the participating EVs includes a geographic location identifier indicating a geographic location of the participating EV, and wherein the generating and communicating to the auction entity at least one aggregated ancillary services offer is further based, at least in part, on the geographic location identifier of the participating EVs associated with said aggregated ancillary services offer.

53. The aggregator of claim 52, wherein the means for generating and communicating the aggregate ancillary services offer based at least in part on the EV location data from at least one of the EVs comprises:

means for calculating a virtual location based on the EV location data; and means for including the virtual location with the aggregated ancillary services offer.

54. The aggregator of claim 39, wherein the criterion is a ping test.

55. The aggregator of claim 39, wherein the criterion is a threshold round-trip time.

56. The aggregator of claim 39, the aggregator further comprising:

means for determining an optimal real-time communications link, from a plurality of available real-time communications links, for use in communicating from the aggregator entity to one of the participating EVs.

57. An aggregator for real-time aggregating of electrical vehicles (EVs) charging, comprising:

means for aggregating, in real time, EV energy demand data from each of a plurality of the EVs;

means for generating and communicating to the auction entity, based on a result of the aggregating, at least one aggregated EV energy demand;

means for testing whether an operability of a real-time communications link from an aggregator entity to one of the EVs fails to meet a given criterion; and means for enabling, if a result of the testing indicates the real-time communication link fails to meet the given criterion, a charging of the EV at a default rate.

58. The aggregator of claim 57, the aggregator further comprising:

means for receiving, from the auction entity, an EV charging enablement data associated with an aggregated EV energy demand among the communicated aggregated EV energy demands and a matching EV charging service offer indicating an offering power generator; and controlling, based on the received EV charging enablement data, a charging of at least one of the EVs.

59. The aggregator of claim 57, wherein the real-time communications link is a wireless communications link.

60. The aggregator of claim 59, wherein enabling the charging of the EV at the default rate includes communicating an indication to the EV of a default rate offer, over a secondary communication channel.

61. The aggregator of claim 59, wherein communicating the indication to the EV of a default rate offer the secondary communication channel includes communicating a on a text-messaging channel of a wireless cellular network.

62. The aggregator of claim 57, wherein aggregating, in real time, includes communicating EV energy demand data from at least one of the plurality of EVs over a real-time wireless link.

63. The aggregator of claim 57, wherein the criterion is a ping test.

64. The aggregator of claim 57, wherein the criterion is a threshold round-trip time.

65. The aggregator of claim 57, the aggregator further comprising:
means for determining an optimal real-time communications link, from a plurality of available real-time communications links, for use in communicating from the aggregator entity to one of the participating EVs.

66. A computer program product, having a non-transitory tangible computer-readable medium comprising a set of computer instructions that upon execution would cause an associated processor to perform a real-time aggregating of electrical vehicle (EVs) energy capacity for real-time auctioning of ancillary services, the computer instructions comprising:
instructions to receive a set-up data identifying each of a plurality of participating EVs;
instructions to aggregate, in real time, EV energy capacity data from each of a plurality of participating EVs;
instructions to generate, based on the EV energy capacity data, an aggregated ancillary services offer;
instructions to communicate the aggregated ancillary services offer to an auction entity;
instructions to test whether an operability of a real-time communications link from an aggregator entity to one of the participating EVs fails to meet a given criterion; and
instructions to enable, if a result of the testing indicates the real-time communication link fails to meet the given criterion, a charging of the participating EV at a default rate.

67. The computer program product of claim 66, wherein the instructions to aggregate, in real time, include instructions to communicate EV energy capacity data from at least one of the plurality of participating EVs over a real-time wireless link.

68. The computer program product of claim 67, the instructions further comprising:
instructions to aggregate, in real time, EV energy demand data from each of a plurality of the participating EVs; and
instructions to generate and communicate to the auction entity, based on a result of the aggregating, at least one aggregated EV energy demand.

69. The computer program product of claim 38, the instructions further comprising:
instructions to receive from the auction entity an aggregator ancillary services control command indicating a matching of an aggregated ancillary services offer with an ancillary services requirement;
instructions to identify at least one participating EV as associated with the aggregated ancillary services offer indicated as matching the ancillary services requirement; and
instructions to send, to an EV support equipment (EVSE) associated with each of the at least one participating EVs, an EVSE ancillary services control command, the EVSE ancillary services control command indicating a control of the EVSE for delivering a power from a storage battery of the associated participating EV to a power grid.

70. The computer program product of claim 68, the instructions further comprising:
instructions to receive, from the auction entity, an EV charging enablement data associated with an aggregated EV energy demand among the communicated aggregated EV energy demands and a matching EV charging service offer indicating an offering power generator; and
instructions to control, based on the received EV charging enablement data, a charging of at least one of the participating EVs.

71. The computer program product of claim 68, wherein the EV energy capacity data from at least one of the participating EVs includes a geographic location identifier indicating a geographic location of the participating EV, and wherein the generating and communicating to the auction entity at least one aggregated ancillary services offer is further based, at least in part on the geographic location identifier of the participating EVs associated with said aggregated ancillary services offer.

72. The computer program product of claim 71, wherein generating and communicating the aggregate ancillary services offer based at least in part on the EV location data from at least one of the EVs comprises:
calculating a virtual location based on the EV location data; and
including the virtual location with the aggregated ancillary services offer.

73. The computer program product of claim 72, the instructions further comprising instructions to receive from the auction entity an aggregator ancillary services control command indicating a matching of an aggregated ancillary services offer with an ancillary services requirement.

74. The computer program product of claim 73, the instructions further comprising:
instructions to identify at least one participating EV as associated with the aggregated ancillary services offer indicated as matching the ancillary services requirement; and
instructions to send, to an EV support equipment (EVSE) associated with each of the at least one participating EVs, an EVSE ancillary services control command, the EVSE ancillary services control command indicating a control of the EVSE for delivering a power from a storage battery of the associated participating EV to a power grid.

75. The computer program product of claim 73, the instructions further comprising
instructions to receive, from at least one of the at least one participating EVs and an EV support equipment (EVSE) associated with each of the at least one participating EVs, an EV verification information corresponding to the EVSE ancillary services control command.

76. The computer program product of claim 75, wherein settling the transaction payment is conditioned on receiving an EV verification information from the at least one of the participating EVs.

77. The computer program product of claim 66, wherein the real-time communications link is a wireless communications link.

78. The computer program product of claim 77, wherein enabling the charging of the participating EV at the default rate includes communicating an indication to the participating EV of a default rate offer, over a secondary communication channel.

79. The computer program product of claim 78, wherein communicating the indication over the secondary communication channel includes communicating over a text-messaging channel of a wireless cellular network.

80. The computer program product of claim 66, wherein the EV energy capacity information indicates a kilowatt power delivery capacity of the participating EV, and wherein the generating and communicating to the auction entity of at least one aggregated ancillary services offer is further based, at least in part, on the kilowatt power delivery capacity of the participating EVs associated with said aggregated ancillary services offer.

81. The computer program product of claim 66, wherein the EV energy capacity data from at least one of the participating EVs includes a geographic location identifier indicating a geographic location of the participating EV, and wherein the generating and communicating to the auction entity at least one aggregated ancillary services offer is further based, at least in part, on the geographic location identifier of the participating EVs associated with said aggregated ancillary services offer.

82. The computer program product of claim 81, wherein the instructions to generate and communicate the aggregate ancillary services offer based at least in part on the EV location data from at least one of the EVs comprise:
   instructions to calculate a virtual location based on the EV location data; and
   instructions to include the virtual location with the aggregated ancillary services offer.

83. The computer program product of claim 66, wherein the criterion is a ping test.

84. The computer program product of claim 66, wherein the criterion is a threshold round-trip time.

85. The computer program product of claim 66, the instructions further comprising:
   instructions to determine an optimal real-time communications link, from a plurality of available real-time communications links, for use in communicating from the aggregator entity to one of the participating EVs.

86. A computer program product, having a non-transitory tangible computer-readable medium comprising a set of computer instructions that upon execution would cause an associated processor to perform a real-time aggregating of electrical vehicle (EVs) energy capacity for real-time auctioning of ancillary services, the computer instructions comprising:
   instructions to aggregate, in real time, EV energy demand data from each of a plurality of the EVs;
   instructions to generate and communicate to the auction entity, based on a result of the aggregating, at least one aggregated EV energy demand;
   instructions to test whether an operability of a real-time communications link from an aggregator entity to one of the EVs fails to meet a given criterion; and
   instructions to enable, if a result of the testing indicates the real-time communication link fails to meet the given criterion, a charging of the EV at a default rate.

87. The computer program product of claim 86, the instructions further comprising:
   instructions to receive, from the auction entity, an EV charging enablement data associated with an aggregated EV energy demand among the communicated aggregated EV energy demands and a matching EV charging service offer indicating an offering power generator; and
   instructions to control, based on the received EV charging enablement data, a charging of at least one of the EVs.

88. The computer program product of claim 87, wherein the instructions to aggregate, in real time, include instructions to communicate EV energy demand data from at least one of the plurality of EVs over a real-time wireless link.

89. The computer program product of claim 86, wherein the real-time wireless link is a wireless cellular communication link.

90. The computer program product of claim 89, wherein the instructions to enable the charging of the EV at the default rate include instructions to communicate an indication to the EV of a default rate offer, over a secondary communication channel.

91. The computer program product of claim 90, the instructions to communicate the indication to the EV of a default rate offer over the secondary communication channel include instructions to communicate over a text-messaging channel of a wireless cellular network.

92. The computer program product of claim 86, wherein the criterion is a ping test.

93. The computer program product of claim 86, wherein the criterion is a threshold round-trip time.

94. The computer program product of claim 86, the instructions further comprising:
   instructions to determine an optimal real-time communications link, from a plurality of available real-time communications links, for use in communicating from the aggregator entity to one of the participating EVs.

* * * * *